(12) United States Patent
Mahdi Hayder et al.

(10) Patent No.: US 10,690,863 B1
(45) Date of Patent: Jun. 23, 2020

(54) COMMUNICATION CABLE IDENTIFICATION

(71) Applicant: Amazon Technologies, Inc., Seattle, WA (US)

(72) Inventors: Alaa Adel Mahdi Hayder, Seattle, WA (US); Kanika Gupta, Seattle, WA (US); Robert Matthew D'Reaux, Leesburg, VA (US); John R. Childress, Hinton, VA (US); Kipper Dale Seljestad, Kennewick, WA (US); Robert Anthony Smith, Leesburg, VA (US); Xavier Passy, Ashburn, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/840,771

(22) Filed: Dec. 13, 2017

(51) Int. Cl.
| | |
|---|---|
| *G02B 6/38* | (2006.01) |
| *G02B 6/42* | (2006.01) |
| *H01R 13/66* | (2006.01) |
| *G06F 13/12* | (2006.01) |
| *H04B 10/25* | (2013.01) |

(52) U.S. Cl.
CPC ......... *G02B 6/3895* (2013.01); *G02B 6/4293* (2013.01); *G06F 13/122* (2013.01); *H01R 13/6683* (2013.01); *H04B 10/2504* (2013.01); *G06F 2213/0008* (2013.01)

(58) Field of Classification Search
CPC ....... G02B 6/447; G02B 6/001; G02B 6/3895
USPC ......... 324/66; 174/112; 709/223; 710/16, 18
See application file for complete search history.

(56) References Cited

U.S. PATENT DOCUMENTS

| | | | | |
|---|---|---|---|---|
| 5,717,428 | A * | 2/1998 | Barrus | G06F 1/3215 345/168 |
| 6,324,605 | B1 * | 11/2001 | Rafferty | G06F 13/4022 710/100 |
| 7,049,937 | B1 * | 5/2006 | Zweig | H01R 13/641 324/66 |
| 7,221,284 | B2 * | 5/2007 | Scherer | G01R 31/045 340/286.02 |
| 8,185,669 | B2 * | 5/2012 | Oh | G09G 5/12 710/8 |
| 8,918,549 | B2 * | 12/2014 | Waters | G06F 1/22 710/16 |
| 9,671,551 | B2 * | 6/2017 | Dean, Jr. | G02B 6/02033 |
| 9,726,610 | B2 * | 8/2017 | Abuelsaad | G01N 21/718 |
| 9,778,308 | B2 * | 10/2017 | Truong | G01R 31/023 |
| 2004/0249991 | A1 * | 12/2004 | Ali | G06F 11/004 710/5 |
| 2006/0165110 | A1 * | 7/2006 | Magendanz | G06F 3/0227 370/419 |
| 2008/0136803 | A1 * | 6/2008 | Slaton | G06F 3/14 345/211 |
| 2008/0167828 | A1 * | 7/2008 | Terlizzi | G06F 13/385 702/64 |

(Continued)

*Primary Examiner* — Faisal M Zaman
(74) *Attorney, Agent, or Firm* — Kilpatrick Townsend & Stockton LLP

(57) ABSTRACT

Systems, methods, and devices for identifying characteristics of communication cable are described. For example, a connector of a communication cable may include a set of pins. When the connector is plugged into an active device such as a transceiver, a pattern of the set of pins may be determined. This pattern may be associated with a characteristic of the communication cable (e.g., manufacture, manufacturing date, etc.).

20 Claims, 5 Drawing Sheets

(56) References Cited

U.S. PATENT DOCUMENTS

| | | | |
|---|---|---|---|
| 2008/0170509 A1* | 7/2008 | Diab | H04L 43/50 370/252 |
| 2008/0240724 A1* | 10/2008 | Aguren | G06Q 10/06 398/139 |
| 2009/0086104 A1* | 4/2009 | Felder | H04N 5/268 348/705 |
| 2009/0167286 A1* | 7/2009 | Naylor | G01R 31/021 324/66 |
| 2009/0272794 A1* | 11/2009 | Lange | H01B 13/344 235/375 |
| 2010/0070660 A1* | 3/2010 | Serisky | H04N 7/15 710/16 |
| 2010/0224328 A1* | 9/2010 | Utaka | H01B 7/368 156/378 |
| 2010/0299449 A1* | 11/2010 | Terlizzi | H04B 15/02 709/237 |
| 2011/0219147 A1* | 9/2011 | Diab | G06F 12/00 710/8 |
| 2012/0005377 A1* | 1/2012 | Kim | G06F 13/4072 710/16 |
| 2012/0034904 A1* | 2/2012 | LeBau | G10L 15/265 455/414.1 |
| 2012/0036284 A1* | 2/2012 | Tao | H04N 21/43635 710/16 |
| 2012/0079140 A1* | 3/2012 | Bar-Niv | G06F 3/14 710/16 |
| 2012/0162531 A1* | 6/2012 | Hsi | G09G 5/006 348/723 |
| 2012/0191880 A1* | 7/2012 | Gandhi | G06F 13/385 710/16 |
| 2013/0052607 A1* | 2/2013 | Gersh | A61C 19/004 433/27 |
| 2013/0137292 A1* | 5/2013 | Abuelsaad | H01R 4/64 439/488 |
| 2013/0162273 A1* | 6/2013 | Chin | G01R 31/31721 324/750.01 |
| 2013/0217274 A1* | 8/2013 | Bar-Niv | H01R 27/02 439/676 |
| 2013/0267120 A1* | 10/2013 | Rothkopf | H01R 13/64 439/620.21 |
| 2013/0288500 A1* | 10/2013 | Munkelt | H01R 13/15 439/246 |
| 2014/0121881 A1* | 5/2014 | Diazdelcastillo | A01D 42/00 701/23 |
| 2016/0188348 A1* | 6/2016 | Hung | G06F 9/4411 710/302 |
| 2017/0239483 A1* | 8/2017 | Mathur | A61N 1/0502 |
| 2018/0042802 A1* | 2/2018 | St. Louis | A61C 1/0023 |
| 2018/0063569 A1* | 3/2018 | Yu | H04N 5/44543 |
| 2018/0341570 A1* | 11/2018 | Yu | G09G 5/006 |

* cited by examiner

COMMUNICATION CABLE IDENTIFICATION

BACKGROUND

Compute components such as computer servers, network switches, and other data center hardware can be connected using communication cables to form a computer network.

Some networks, such as those found in datacenters, now include hundreds of thousands of individual cables. Accordingly, identifying cables with particular characteristics can be difficult.

BRIEF DESCRIPTION OF THE DRAWINGS

Various examples in accordance with the present disclosure will be described with reference to the drawings, in which.

DETAILED DESCRIPTION

Figure 1:
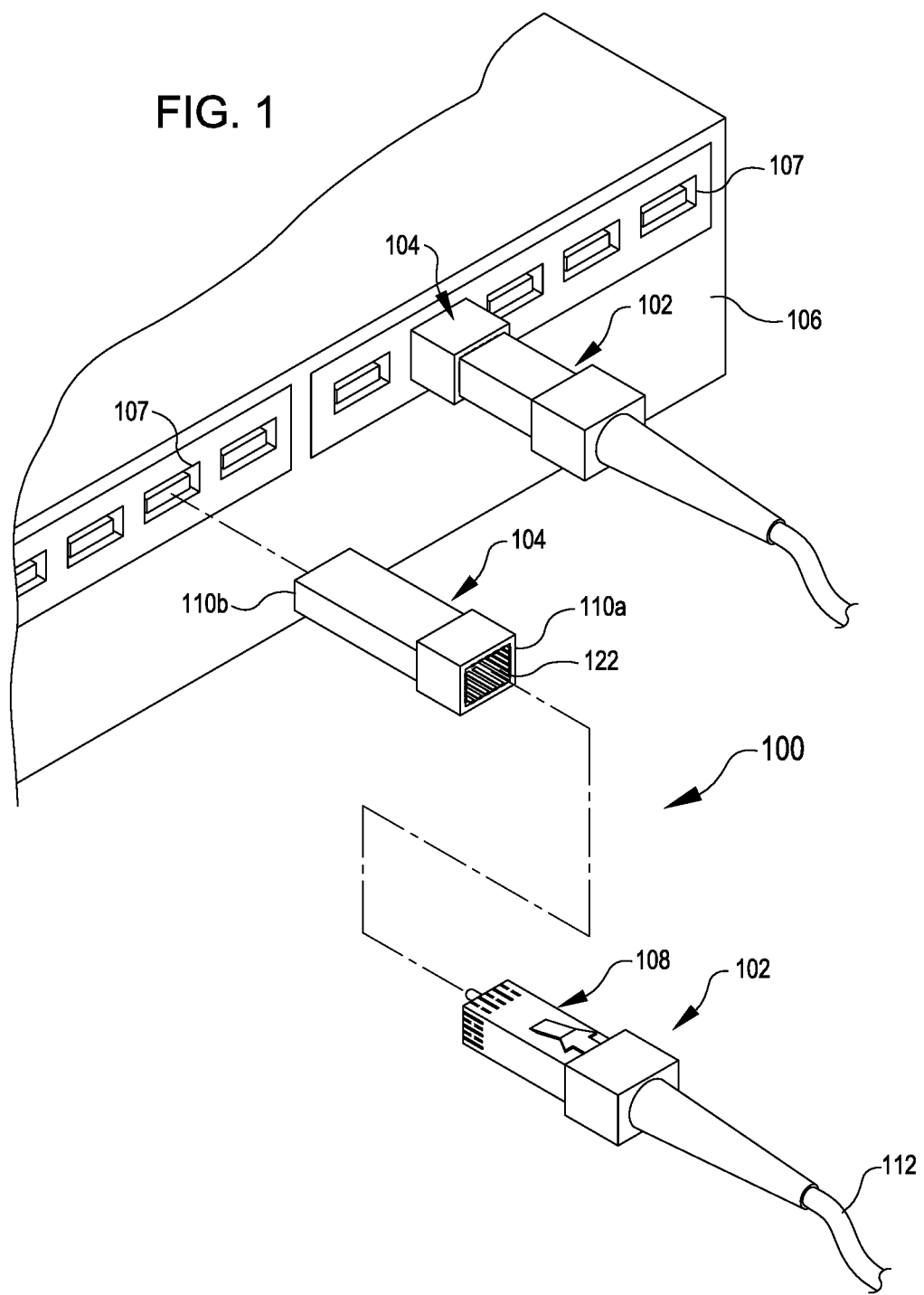
FIG. 1 illustrates a partially exploded view of an example system for identifying information about a communication cable, according to at least one example.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Examples described herein are directed to systems, devices, and techniques for identifying information about communication cables. These techniques can be scaled to identify and/or track such information at any suitable level of granularity (e.g., rack-level, datacenter-level, network-level, etc.). The techniques described herein can identify and/or track information about communication cables in a manner that does not require manual input (e.g., scanning of barcodes) or the addition of cost prohibitive tracking devices (e.g., radio-frequency identification (RFID) systems). For example, cable connectors of the communication cables can be modified to include patterns of conductive pins. These conductive pins may be used primarily for cable detection. For example, the pin patterns may uniquely identify manufactures of the cable. Depending on the complexity of the pin patterns and the frequency at which they are updated, the pin patterns can also identify other characteristics of the cable such as the year the cable was manufactured, the facility at which the cable was manufactured, etc. When a connector with a particular pin pattern is installed into a port of an active device (e.g., a transceiver, networking equipment, patch panel, or other electrically-powered device), the active device may be used to identify the cable. In particular, the active device may apply a voltage to its conductive pins using a send circuit, and measure voltage differences between its conductive pins using a measuring circuit to identify the conductive pins of the connector that form the particular pin pattern. In some examples, this may include identifying which pins in the connector have a particular voltage, such a high voltage (e.g., representative of a logical 1) and/or a low voltage (e.g., representative of a logical 0). A pin pattern can be interpreted as a data sequence, such as a binary number.

Turning now to a particular example, a connector of a fiber optic cable is modified to include a pattern of a first set conductive contacts (e.g., pins) disposed at an exterior surface of the connector. The pattern of the first set conductive contacts identifies (possibly uniquely) one or more characteristics of the fiber optic cable (e.g., type of cable, manufacturing characteristics, etc.). To connect the fiber optic cable to networking equipment, a pluggable transceiver (e.g., Quad Small Form-factor Pluggable) may be installed between the networking equipment and the fiber optic cable. The pluggable transceiver may include a male end that can be installed into the network equipment, a female port to receive the connector, and a microprocessor. The female port may include a second set of conductive contacts disposed at an interior surface of the female port and electrically connected to the microprocessor. When the connector is installed in the female port, the pattern of the first set of conductive contacts of the connector may align with and physically contact a subset of the second set of conductive contacts on the interior surface of the female port. The microprocessor may apply a reading voltage to the second set of conductive contacts to identify the subset of the second set of conductive contacts that are in contact with the first set of conductive contacts of the connector. In particular, applying the reading voltage may include using a send circuit of the microprocessor to send a voltage to each conductive contact of the second set of conductive contacts, and measuring, using a measuring circuit or other sensor, an electrical characteristic (e.g., voltage, current, or resistance) caused by the voltage of the send circuit. Those contacts of the second set of conductive contacts that do not physically contact contacts of the first set of conductive contacts will register a first value of an electrical characteristic (e.g., a low voltage). Those contacts of the second set of conductive contacts that physically contact contacts of the first set of conductive contacts will register a second value of the electrical characteristic (e.g., a high voltage). Based on these differences of these values, the subset of the second set of conductive contacts may be identified. The subset of the second set of conductive contacts corresponds directly to the pattern of the first set of conductive contacts. The pattern can be stored in a database and information about the cable can be associated with the pluggable transceiver, a port of the networking equipment, etc.

Turning now to the figures, FIG. 1 illustrates a cable detection system 100, according to at least one example. The cable detection system 100 includes a communication cable 102, a transceiver 104, and networking equipment 106. The transceiver 104 includes a first interface 110b disposed at a first end and a second interface 110a disposed at a second end opposite the first end. The transceiver 104 may be any suitable transceiver capable of receiving and transmitting data between the communication cable 102 and the networking equipment 106. In some embodiments, the transceiver 104 may interface the networking equipment 106 to the communication cable 102.

In some examples, the transceiver 104 may be a Quad Small Form-factor Pluggable (QSFP) transceiver, a C form-factor pluggable (CFP) transceiver, a Octal Small Format Pluggable (OSFP) transceiver, a Small Form-factor Pluggable (SFP) transceiver, any other suitable transceiver. The first interface 110a may be any suitable interface sized and configured to interface with (e.g., receive a portion of) the communication cable 102. The second interface 110a may be any suitable interface sized and configured to interface with (e.g., be received into a port of) the networking equipment 106.

The networking equipment 106 may be any suitable piece of networking hardware including, for example, network servers, switches, gateways, routers, network bridges, modems, line drivers, hubs, repeaters, multilayer switches, protocol converters, bridge routers, proxy servers, firewalls, network address translators, multiplexers, network interface controllers, patch panels, and any other suitable device used for computer networking. In this manner, the networking equipment 106 may include one or more ports 107 which may be used to receive and/or transfer data. The ports 107 may be sized and configured to receive and/or otherwise couple with the second interface 110a of the transceiver 104.

The communication cable 102 includes a connector 108 that interfaces with the first interface 110a. For example, the first interface 110a may be a port that is sized and configured to receive a portion of the connector 108. The communication cable 102 also includes a communication medium 112, a distal portion 112a of which (e.g., a ferrule) is illustrated as extending within the connector 108. In the example described herein, the communication medium is optical fibers. It should be understood, however, that the techniques described herein may be applied to any other suitable communication medium, including copper wires.

The type and configuration of the connector 108 and the type and configuration of the transceiver 104 may correspond to enable compatibility with each other and with networking equipment. For example, the connector 108 may be of the same form factor as a LC connector (e.g., a "Little Connector" or "Lucent Connector") and the transceiver 104 may be a QFSP with LC compatibility. In some examples, the connector 108 may be pluggable into the transceiver 104. Generally, when the communication medium 112 is optical fibers, the connector 108 may be a modified version (e.g., include the addition of the conductive pins) and/or be in the same form factor of any suitable fiber optic connector (e.g., ST connector, SC connector, MTP® connector, Fiber Distributed Data Interface (FDDI) connector, Mechanical Transfer-Registered Jack (MTRJ) connector, 10G-CX4 connector, Infiniband™ connector, or any other suitable connector). If the communication medium 112 is copper wire, the connector 108 may be, for example, and RJ-45 connector.

While the illustrated example depicts a single ferrule, it should be understood that cables and connectors including more than one ferrule may also benefit from the concepts described herein. In particular, in a dual-ferrule connector, a unique pin pattern may be assigned to the connector itself or may be assigned to the two communication cables that are connected using the dual-ferrule connector. In the first example, the pins of the unique pattern may be identified using corresponding pins in two ports on the active device. In the latter example, the pins of a first pattern corresponding to the first cable may be identified using corresponding pins from a first port, and the pins of the second pattern corresponding to the second cable may be identified using corresponding pins from a second port of the active device.

Figure 2:
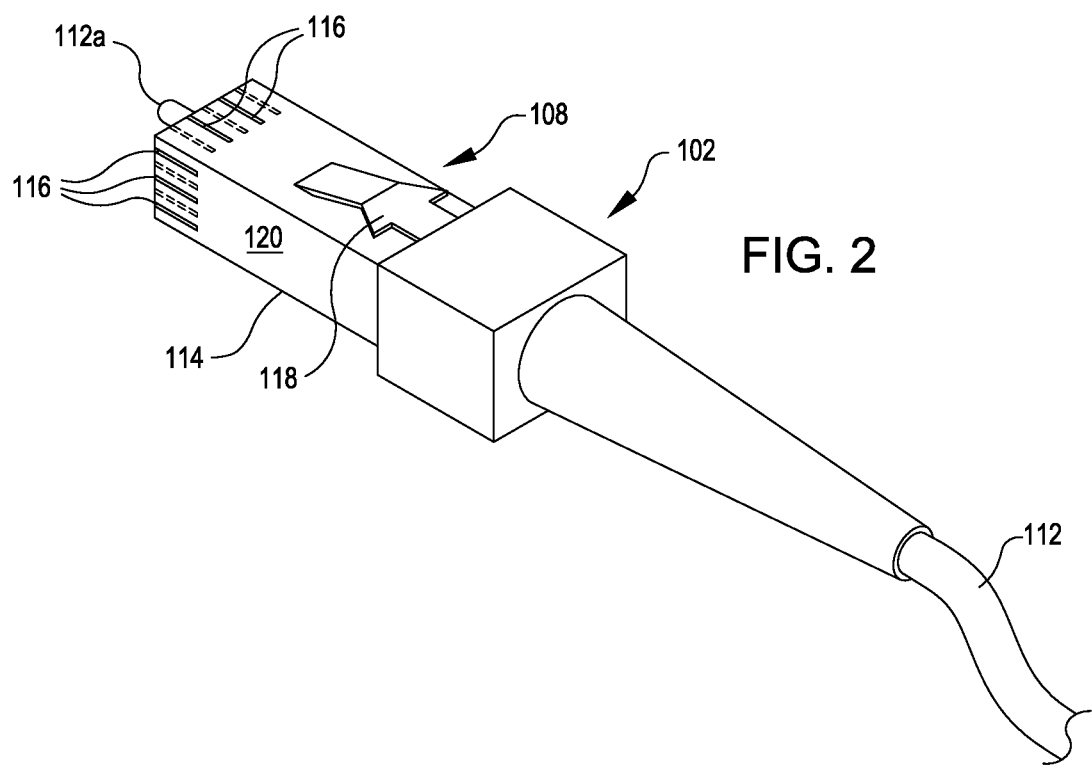
FIG. 2 illustrates a perspective view of an example communication cable including a connector, according to at least one example.

As further illustrated in FIG. 2, the connector 108 can include a connector body 114, conductive pins 116, and a coupling mechanism 118. The connector body 114 may have any suitable shape (e.g., round, rectangular, etc.), which may correspond to the first interface 110a. The connector body 114 may extend around at least a portion of the communication medium 112. For example, the distal portion 112a of the communication medium 112 is illustrated as extending within the connector body 114 and beyond a distal end of the connector body 114.

The conductive pins 116, which are examples of conductive contacts, may take any suitable shape. For example, as illustrated in the FIGS., the conductive pins 116 can have a rectangular shape. In some examples, the shape of the conductive pins 116 may be round, oval, oblong, square, rectangular, triangular, trapezoidal, or take any other shape. In some cases the pins 116 are referred to more generally as "contacts," and the pin pattern is referred to more generally as a "contact pattern."

The conductive pins 116 can be formed directly into or onto the connector body 114 using any suitable deposition technique. In some examples, the conductive pins 116 are printed to a sticker that is applied to the connector body 114. For example, a flexible circuit board can be printed that includes exposed contacts that are arranged into some fixed pattern. The flexible circuit board can be adhered to the connector body 114 in any suitable manner (e.g., peel and stick, glued, melted, etc.).

The conductive pins 116 can be arranged into any suitable pin pattern at any suitable surface of the connector body 114. In some examples, the conductive pins 116 are disposed at an exterior surface 120 of the connector body 114. The connector body 114 may have any suitable shape. For example, a profile of the connector body 114 taken transverse to the direction of the communication cable 112 may be round, oblong, oval, square, rectangular, triangular, trapezoidal, or take any other shape. As the exterior surface 120 extends along connector body 114, the exterior surface 120 may correspond to the shape of the connector body 114. In some examples, the connector body 114 may include an alignment structure (e.g., tab, indents, etc.) that corresponds to a similar alignment structure on the transceiver 104 (or other port). The alignment structures may be configured to orient the connector body 114 appropriately with respect to the transceiver 104.

In other examples, the conductive pins 116 are disposed at an interior surface of the connector body 114. Whether at an interior surface of the exterior surface 120, the conductive pins 116 may be disposed on one or more sides of the connector body 114 (note that the body 114 can have varying numbers of sides, such as three sides, four sides, fives sides, or another number). For example, when the connector body 114 has a rectangular profile, the conductive pins 116 may be disposed on all four sides (e.g., four exterior surfaces) or fewer sides. As an additional example, when the connector body has a circular profile, the conductive pins 116 may be disposed in various quadrants of the cylinder.

The arrangement of the conductive pins 116 on the connector body 114 into a pin pattern may convey some unique information about the communication cable 102. In some examples, although the arrangement may be incapable of uniquely identifying the precise segment of the communication cable 102 as would a serial number, the arrangement may nevertheless be capable of identifying other characteristics of the communication cable 102 as would a part number. Examples of such characteristics which may encoded in the pin pattern and/or derived from the pin pattern include: cable type, connector type, cable length, cable range, cable color, fiber type, manufacturer, manufacturing date, manufacturing location, a part number of the communication cable, operational characteristics of the cable (e.g., fiber attenuation loss, connector loss including insertion loss and return loss, slice loss), glass type, test data, and any other suitable characteristic.

In some examples, a purchaser or a third-party may provide instructions to communication cable manufactures regarding pin patterns. For example, a purchaser may request that manufacturer Acme Cabling apply a particular pin pattern to all Type A communication cable manufactured in the first quarter of 2018 on behalf of the purchaser. Once installed in the purchaser's facility (e.g., a datacenter), the purchaser can use the techniques described herein to map the communication cable. Doing so may be helpful for identifying and resolving failure conditions in the datacenter, doing periodic cable replacement or upgrading, responding to recalls of cable, etc. For example, because information is known about the characteristics of the communication cables and where such cables are located in the datacenter, when a manufacturing defect of cable having the same pin pattern is discovered, all locations of the cables can be quickly identified. This can be used to help estimate potential exposure as a result of the manufacturing defect.

The coupling mechanism 118 may be any suitable mechanism to enable coupling of the connector 108 with the transceiver 104. Thus, the coupling mechanism 118 may include a latch clip, snap, a bayonet-style nut, or other similar device.

Figure 3:
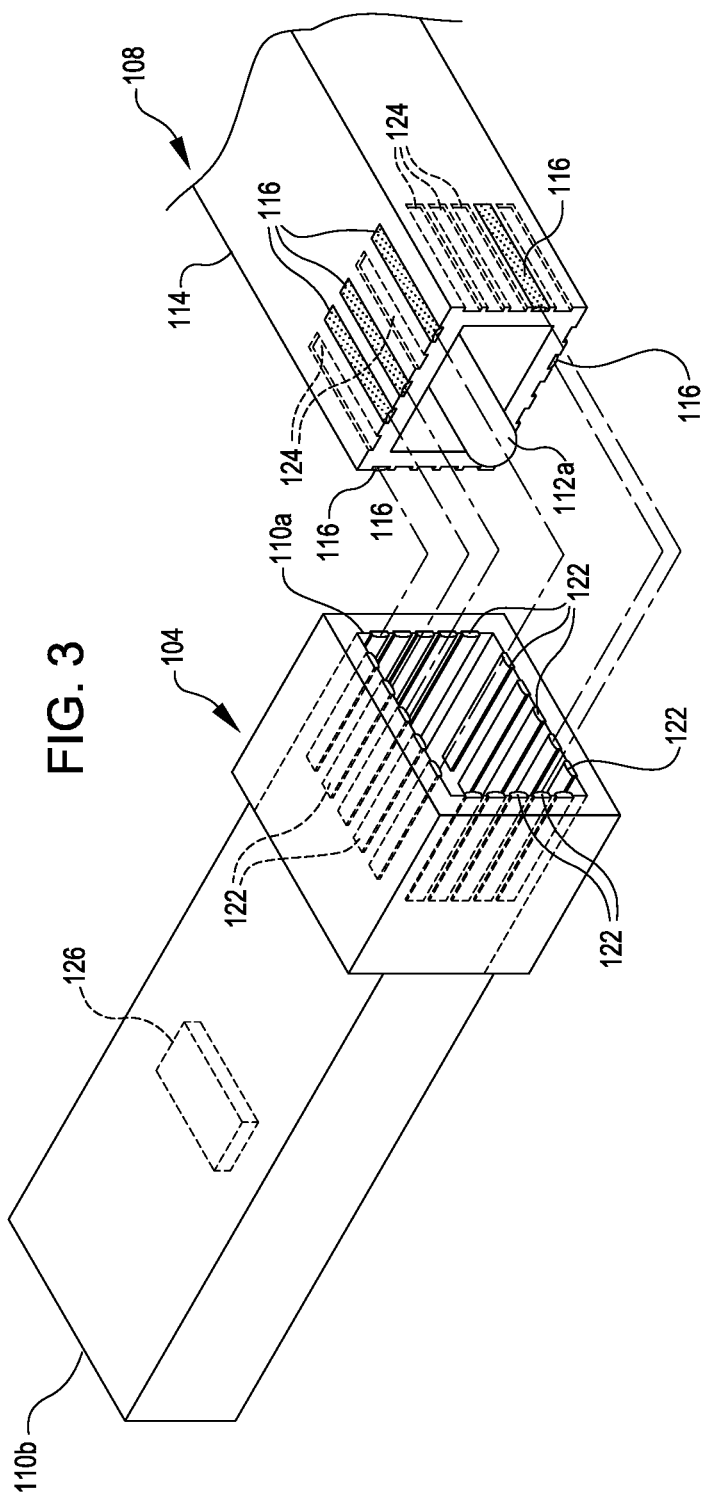
FIG. 3 illustrates an offset perspective view of a connector and a transceiver, according to at least one example.

FIG. 3 illustrates the first interface 110a of the transceiver 104 and a portion of the connector body 114. The distal portion 112a of the communication medium 112 is illustrated as being within a cavity 124 of the connector body 114. The connector body 114 also includes pin locations 124, with the conductive pins 116 being disposed at some of the pin locations 124. For example, six conductive pins 116 (e.g., three on the top surface, one on the side surface, one on the rear surface, and one on another side surface) are disposed at six of the pin locations 124 on the connector body 114.

The first interface 110a of the transceiver 104 may also include conductive pins 122. In some examples, the number of conductive pins 122 is equal to or greater than the number of conductive pins 116. For example, the number of conductive pins 122 may equal the number of pin locations 124 from the connector body 114.

The conductive pins 122 may be electrically connected to a management component 126 to enable application of a voltage to the conductive pins 122. As described in further detail with reference to FIGS. 4A-4C, when the connector body 114 is inserted into the first interface 110a, application of the voltage to the conductive pins 122 may be used to determine at which pin locations 124 the conductive pins 116 are located and/or whether a given pin has a signal representing a logical 1 or a logical 0. For example, the conductive pins 122 may include one or more power pins (a "VDD pin") that aligns with one or more corresponding VDD pins on the connector body 114. The conductive pins 122 may also include one or more ground pins (a "GND pins") that align with one or more corresponding GND pins on the connector body 114, and a plurality of signal pins that correspond to the pin locations 124 on the connector body 114. As explained in more detail below, when the connector body 114 is inserted into the transceiver 104, at least one VDD pin of the transceiver 104 aligns with at least one VDD pin of the body 114, thus enabling the signal pins of the transceiver 104 to detect voltages from one or more conductive pins 116 on the connector body 114. The voltages read from the conductive pins 116 can be interpreted as a sequence of 1s and 0s by the management component 126 using any suitable standard input/output command (e.g., i2C, EEPROM registers, etc.). Other approaches for identifying pin patterns are described herein.

Applying the voltage to the conductive pins 122 may include applying a voltage using a send circuit (or other circuit) of the management component 126 and identifying high/low voltage at the conductive pins 122 using a measuring circuit of the management component 126. In some examples, the transceiver 104 may include a power source for powering the management component 126. In other examples, the transceiver 104 may receive power from the networking equipment 106.

The management component 126 may include a processing device and a computer-readable medium, such as a random access memory (RAM) coupled to the processing device. The processing device may execute computer-executable program instructions stored in memory, such as executing one or more computer programs. Such processing devices may include a microprocessor, a digital signal processor (DSP), an application-specific integrated circuit (ASIC), field programmable gate arrays (FPGAs), state machines, or other processing means for generating and reading electrical signals with respect to the conductive pins. Although FIG. 3 depicts the management component 126 as being within the transceiver 104, in some embodiments the management component 126 can be housed outside of the transceiver 104.

The processing device may include, or may be in communication with, media, for example computer-readable storage media, that may store instructions that, when executed by the processing device, cause the processing device to perform the steps described herein as carried out, or assisted, by a processing device. Examples of computer-readable media may include, but are not limited to a memory chip, ROM, RAM, ASIC, or any other storage means from which a processing device can read or write information.

Once the pin pattern has been identified, and possibly converted into a binary number or other format, additional information about the communication cable 102 may also be derived. For example, information about the pin pattern can be shared with a server computer that has access to a cable database such as a lookup table (e.g., see Table 1 below) which stores information about communication cable in an enterprise, facility, datacenter, network, organization, etc. Using the pin pattern, additional information about the communication cable 102 can be retrieved from the cable database. Using any suitable technique, the additional information may be displayed in any suitable manner. For example, a cable map may be created that identifies characteristics of communication cable in a particular datacenter. Using input/output commands, the formatting of the cable map may be adjusted to convey different information. For example, all cable segments manufactured by Acme Cable may be highlighted. In some examples, the cable map may be filtered at a finer level of granularity (e.g., cable type, manufacturing location, manufacturing time, etc.).

Table 1 shown below may include information for a few communication cables that have been identified using the techniques described herein.

| Binary Number for the Pin Pattern | Manufacturer | Type | Date Manufactured | Location | Quantity |
|---|---|---|---|---|---|
| 10010 | Acme Cable | Single Mode Fiber | June 2017 | Facility X | ~100,000 feet |
| 00111 | Optic Cable | Multi-mode fiber | August 2016 | Facilities Y and Z | ~250,000 feet |

Figure 4A:
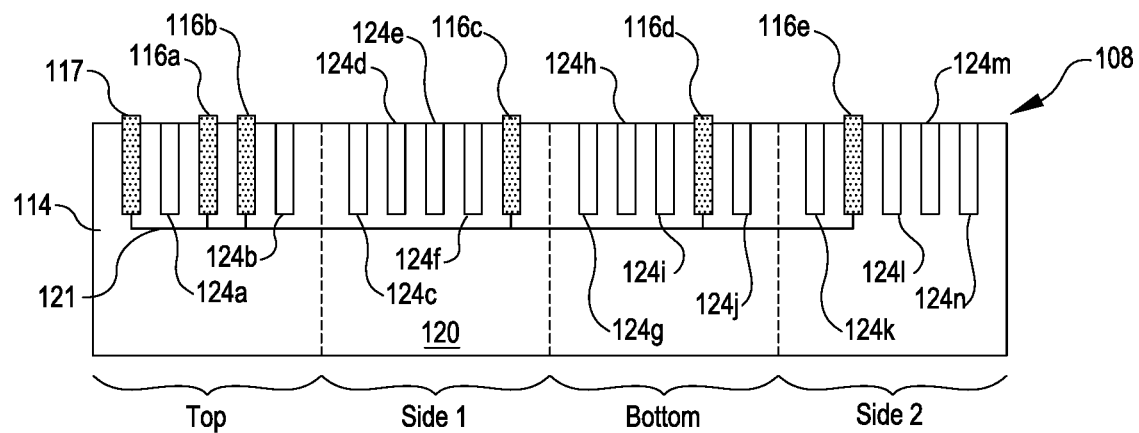
FIG. 4A illustrates an example view of a pin pattern of a connector, according to at least one example.
Figure 4B:
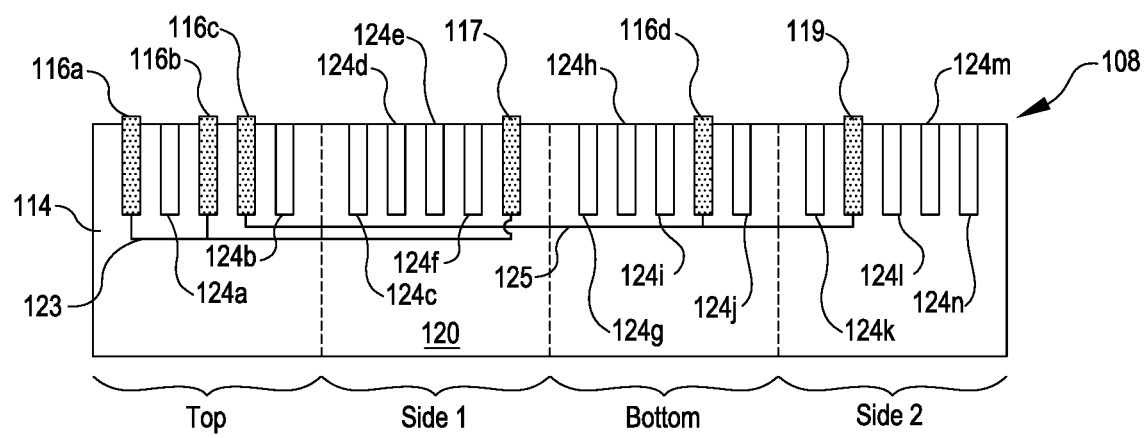
FIG. 4B illustrates an example view of a pin pattern of a connector, according to at least one example.
Figure 4C:
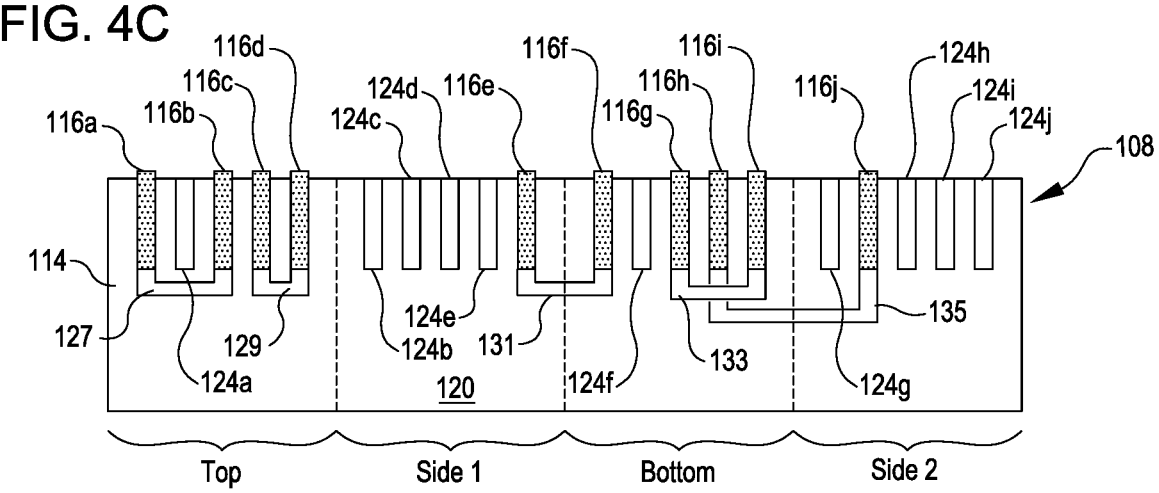
FIG. 4C illustrates an example view of a pin pattern of a connector, according to at least one example.

FIGS. 4A-4C illustrate flattened views of the exterior surface 120 of the connector body 114; that is, these figures show four adjacent sides of exemplary embodiments of the exterior surface 120 spread onto a single plane. In FIGS. 4A-4C, a top, bottom, and two sides are depicted in a manner that emphasizes the pin pattern formed from the conductive pins 116 and the pin locations 124. In particular, the pattern is the combination of conductive pins 116 and pin locations 124 (without conductive pins 116) extending along the exterior surface 120.

Turning to FIG. 4A, in FIG. 4A the connector body 114 includes a power pin 117 (e.g., a VDD pin) connected to a plurality of conductive pins 116a-116e via a conductive trace 121. The conductive trace 121 may be disposed within the connector body 114 and/or on top of the exterior surface 120. The conductive trace 121 electrically couples the power pin 117 with each of the conductive pins 116a-116e. The transceiver 104 also includes a power pin that aligns with and physical contacts the power pin 117 when the connector 108 is plugged into the transceiver 104.

To identify the pin pattern depicted in FIG. 4A, a desired voltage (e.g., 1.0 V, 3.3 V, 5.0 V, or another voltage) is applied to the power pin of the transceiver 104 which drives the power pin, and thus the conductive pins 116a-116e, to the desired voltage. The signal pins 122 in the transceiver 104 that correspond to and physically contact the conductive pins 116a-116e will detect a voltage on the pins 116a-116e, thus indicating the presence of the pins 116a-116e at their respective positions on the exterior surface 120. The signal pins 122 in the transceiver 104 that correspond to the pin locations 124a-124n will not detect a voltage (since these locations expose a non-conductive material to the corresponding signal pins 122), meaning that there is not a conductive pin 116 at that pin location of the exterior surface 120. This approach allows the determination of the presence and absence of pins at particular locations on the connector body 114.

In this example, assuming that the presence of a pin is interpreted as a logical 1 and the absence of a pin is interpreted as a logical 0, the pin pattern for the connector 108 is 1-0-1-1-0-0-0-0-1-0-0-0-1-0-0-1-0-0-0. (This example counts the power pin 117 as a logical 1.) Of course other pin patterns including greater or fewer possible digits are possible. In some examples, the order of the digits within the binary code and the total code itself may represent information about the communication cable 102. In this manner, more detailed information may be derived directly from the pin pattern without having to access a database that includes a reference identifier associated with the pin pattern. For example, the top portion may identify a manufacturer, a side portion may identify a type of cable, a bottom portion may identify a date or date range of manufacture, and another side portion may identify a location of manufacture.

Turning to FIG. 4B, in this embodiment the connector body 114 includes a power pin 117 electrically coupled to conductive pins 116a and 116b via a conductive trace 123. The connector body 114 also includes a ground pin 119 electrically coupled to conductive pins 116c and 116d via a conductive trace 125.

In this example, the transceiver 104 includes a power pin that aligns with and physically contacts the power pin 117 when the connector 108 is plugged into the transceiver 104. The transceiver 104 also includes a ground pin that aligns with and physically contacts the ground pin 119 when the connector 108 is plugged into the transceiver 104.

To identify the pin pattern depicted in FIG. 4B, the power pin of the transceiver drives the power pin 117 high, which in turn drives the conductive pins 116a and 116b high. The ground pin of the transceiver drives the ground pin 119 and the pins 116c, 116d low. The signal pins 122 in the transceiver 104 that correspond to and physically contact the conductive pins 116a and 116b will register these pins as high pins (e.g., a 1). The signal pins 122 in the transceiver 104 that correspond to and physically contact the conductive pins 116c and 116d will register these pins as low pins (e.g., a 0). This approach may assign a high/low logical value to those pin locations 124 on the connector body 114 that are either connected to the power pin 117 or the ground pin 119. In this example, the pin pattern for the connector 108, which is derived from the high and low pins detected earlier, may be represented by 1-1-0-0.

Using this approach, an order of the signal pins 122 that register as high/low pins (e.g., moving left to right in the example of FIG. 4B) may be relied up with less emphasis upon actual pin location. In further embodiments of the version shown in FIG. 4B, the absence of a pin at a particular position can also be detected (e.g., because no voltage is detected at that position), and this absence can be interpreted as a third value (e.g., an "X" value). Thus an interpretation of the pin pattern for the Top portion of FIG. 4B could be 1-X-1-0-X.

Turning to FIG. 4C, in FIG. 4C the connector body 114 includes conductive pins 116a-116j. Sets of the conductive pins 116a-116j are connected together using conductive traces, conductive pins, conductive plates, or other conductive materials. For example, the conductive pins 116a and 116b together form a first conductive element. Likewise, the conductive pins 116c and 116d form a second conductive element, the conductive pins 116e and 116f form a third conductive element, the conductive pins 116g and 116i form a fourth conductive element, and the conductive pins 116h and 116j form a fifth conductive element. The conductive elements can be formed from a single piece of conductive material or may otherwise be connected using conductive traces or other suitable wiring techniques. When the two conductive pins 116 that make up a conductive element are adjacent to each other (e.g., the conductive pins 116c and 116d), the conductive element can be formed from a single piece of conductive material (e.g., a rectangular-shaped plate, instead of the U-shaped form shown in FIG. 4C).

In this example, power pin and ground pin on the connector 108 are not required. In the transceiver, any two signal pins can be used to identify whether corresponding pins of the conductive pins 116 form an electrical connection (e.g., are connected). Connected pins (e.g., conductive elements) can be interpreted as a 1. Any two pins that do not form an electrical connection can be interpreted as a 0.

For example, to identify the pin pattern depicted in FIG. 4C, a voltage is applied through a first signal pin in the transceiver 104 that is aligned with and physically contacts the conductive pin 116a. The transceiver 104 can detect which of the signal pins 122 registers a corresponding voltage. Because there is no conductive pin 116 at the pin location 124a, the corresponding signal pin 122 in the transceiver 104 will not detect the voltage. However, because of the connection with the conductive pin 116b, current will flow through the conductive pin 116a and the conductive pin 116b and through a third signal pin 122 the transceiver 104. Thus, a voltage will be registered at the third signal pin 122 corresponding to the conductive pin 116b. Once a connection has been identified between a pair of conductive pins 116, the transceiver 104 may begin testing the next signal pin 122 (e.g., the second signal pin) and so and so forth until all conductive pin pairs (e.g., conductive elements are registered). When a conductive pin pairing is detected, this data may be interpreted as a 1. When a pin pairing is not discovered (e.g., not conductive pin 116), this data may be interpreted as a 0. In this manner, a pin pattern may be discovered on the connector 108.

Figure 5:
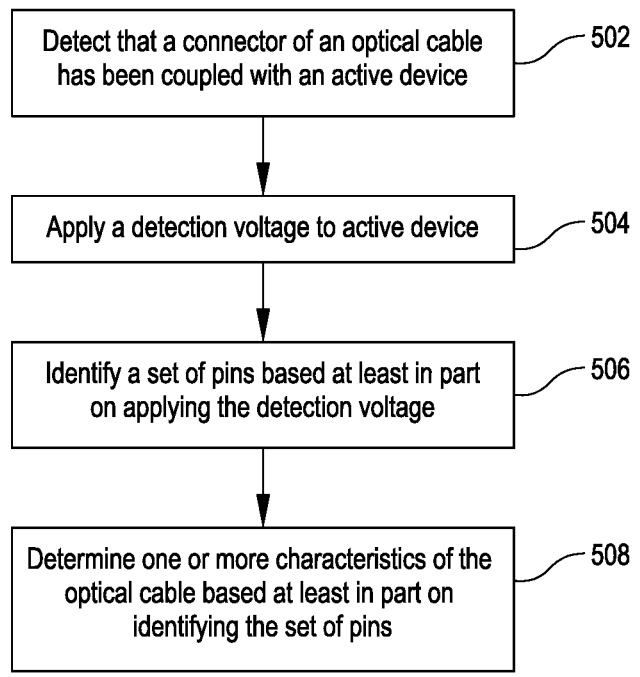
FIG. 5 illustrates an example flowchart showing a process for identifying information about a communication cable, according to at least one example.

FIG. 5 illustrates an example flow diagram showing process 500 as described herein. The process 500 is illustrated as logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

In particular, FIG. 5 illustrates a flow diagram depicting the process 500 for implementing techniques relating to determining characteristics of a communication cable using a pin pattern, according to at least one example. The management component 126 may perform the process 500.

The process 500 may begin at 502 by detecting that a connector of an optical cable has been coupled with an active device. This may include detecting that an electrical circuit has been formed between the connector and the active device using any of the techniques described herein (e.g., those discussed with reference to FIGS. 4A-4C). The active device may be any suitable electrically-powered device that can receive the connector (e.g., a transceiver, network equipment, patch panel, and other similar devices). The connector may include a first plurality of pins. The first plurality of pins may be conductive pins that are spaced about a body of the connector. In some examples, the first plurality of pins is disposed on an exterior surface of the connector, and the second plurality of pins is disposed on an interior surface of an opening of the active device.

In some examples, the active device may be a transceiver that includes a first interface disposed at a first end and a second interface disposed at a second end. The first interface may be configured to couple with network equipment. The second interface may be configured to couple with the connector.

At 504, the process 500 may include applying a detection voltage to the active device. In some examples, this may include applying the detection voltage to a second plurality of pins of the active device. The second plurality of pins may be conductive pins that are spaced about a port of the active device.

At 506, the process 500 may include identifying a set of pins based at least in part on applying the detection voltage. In some examples, the set of pins is a set of the second plurality of pins that correspond to the first plurality of pins. The correspondence between the set of pins and the first plurality of pins may be one-to-one. The correspondence between the first plurality of pins and the second plurality of pins may be one-to-many.

At 508, the process 500 may include determining one or more characteristics of the optical cable based at least in part on identifying the set of pins. This may include, for example, generating characteristic information based at least in part on the one or more characteristics, and providing at least a portion of the characteristic information for presentation at a display and/or as part of a message or report. The characteristic information may include information about the optical cable. In some examples, determining the one or more characteristics may include determining a pin pattern based at least in part on the identified set of pins, and accessing a database to identify the one or more characteristics based at least in part on the pin pattern. Thus, the pin pattern may act as an identifier usable to look up additional information about the cable in the database.

The display may be a display of a user device (e.g., a client device that accesses a server at which the database is stored). In some examples, the display may be installed within a datacenter at a location adjacent to a rack in which the networking equipment is held. In this manner, information about the cable may be presented to an installer in about real-time as the installer installs cable. For example, if the install attempts to installer cable that is not approved, a message may be presented at the display. Similarly, as the installer installs the cable, a message may be presented that lists characteristics of the cable. This may enable the installer to cross check the actual cable with what the system has on file.

In some examples, blocks 502-508 are performed by a management component of the active device.

In some examples, the process 500 may further include determining whether a port of the network equipment is occupied. This may including using the same or similar techniques described herein to identify information about the port. For example, an electrical signal may be sent to the port to determine whether any conductive pins of the port are pushed high. If so, it may be inferred from this information that the port is occupied by a connector that includes corresponding conductive pins that caused the conductive pins to push high. In further embodiment a mechanical switch can be used to detect the present of the connector in the port.

Based on the disclosure and teachings provided herein, a person of ordinary skill in the art will appreciate other ways and/or methods to implement the various examples. The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Examples are described herein, including various modes known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A system, comprising:
    a communication cable that comprises:
        an optical fiber core; and
        an optical fiber connector disposed at a distal end of the communication cable, the optical fiber connector comprising:
            a connector body that extends around a distal end of the optical fiber core, the connector body comprising an exterior surface; and
            a first plurality of pins disposed at the exterior surface and arranged into a first pin pattern, the first pin pattern corresponding to a characteristic of the communication cable; and
    a transceiver coupled with network equipment, the transceiver comprising an interface comprising:
        a port sized and configured to receive the connector body, the port comprising an interior surface; and
        a second plurality of pins disposed around the interior surface and arranged such that the first plurality of pins contact a portion of the second plurality of pins when the port receives the connector body; and
    a management component configured to:
        identify the first pin pattern by applying a voltage to two or more pins of the second plurality of pins and measuring an electrical characteristic caused by the voltage at one or more pins of the first plurality of pins; and
        determine the characteristic of the communication cable based on the identified first pin pattern.

2. The system of claim 1, wherein the transceiver comprises a quad small form-factor pluggable (QSFP) transceiver.

3. The system of claim 1, wherein:
    the connector body further comprises a plurality of sides, with the exterior surface extending across each of the plurality of sides; and
    the first plurality of pins is disposed on at least two of the sides.

4. The system of claim 1, wherein the characteristic of the communication cable comprises a manufacturer of the communication cable, a part number of the communication cable, a manufacturing date of the communication cable, or a manufacturing location of the communication cable.

5. The system of claim 1, wherein:
    identifying which of the second plurality of pins contact the first plurality of pins comprises:
        using one of the second plurality of pins to apply a voltage to a VDD pin of the first plurality of pins; and
        using other ones of the second plurality of pins to determine which locations on the exterior surface of the connector body have other pins of the first plurality of pins that are driven to the voltage; and
    wherein the management component is further configured to generate a binary value that indicates which locations on the exterior surface are occupied by pins of the first plurality of pins.

6. A connector, comprising:
    a connector body configured to receive a distal end of a communication cable, the connector comprising an exterior surface; and
    a plurality of conductive contacts disposed at the exterior surface and arranged into a contact pattern, the contact pattern:
        corresponding to a characteristic of the connector; and
        configured for use by an active device to determine a characteristic of the connector by at least measuring an electrical characteristic of one or more conductive contacts of the plurality of conductive contacts caused when:
            a voltage is applied to two or more pins contained within a port of the active device, and the connector is coupled to the port such that the two or more pins contact a portion of the one or more conductive contacts.

7. The connector of claim 6, wherein individual conductive contacts of the plurality of conductive contacts are disposed on two different sides of the exterior surface.

8. The connector of claim 6, wherein the characteristic is a manufacturer of the connector, and the contact pattern is configured to identify the manufacturer.

9. The connector of claim 6, wherein the connector is an optical fiber connector.

10. The connector of claim 9, wherein the optical fiber connector is in the same form factor as a LC connector.

11. The connector of claim 6, wherein the characteristic of the connector comprises a connector type, a length of a communication cable connected to the connector, a color of the communication cable, a type of transport medium of the communication cable, an operational characteristic of the communication cable, or a manufacturer of the communication cable.

12. The connector of claim 6, wherein one of the plurality of conductive contacts is connected to another of the plurality of conductive contacts by a conductive trace.

13. A computer-implemented method, comprising:
detecting that a connector of a network cable is coupled with a port of a network device, the connector comprising a first plurality of pins;
using a second plurality of pins of the port to detect a pattern of the first plurality of pins by applying a voltage to two or more pins of the second plurality of pins and measuring an electrical characteristic caused by the voltage at one or more pins of the first plurality of pins, the one or more pins forming the pattern; and
determining a characteristic of the network cable based on the detected pattern of the first plurality of pins.

14. The computer-implemented method of claim 13, further comprising:
obtaining characteristic information based on the characteristic; and
providing the characteristic information for presentation at a display.

15. The computer-implemented method of claim 13, wherein determining the characteristic further comprises accessing a database to identify the characteristic based on the detected pattern of the first plurality of pins.

16. The computer-implemented method of claim 13, wherein the network device comprises a transceiver that comprises:
a first interface disposed at a first end, the first interface configured to couple with network equipment; and
a second interface disposed at a second opposite end, the second interface comprising the port.

17. The computer-implemented method of claim 13, wherein the determining is performed by a management component of the network device.

18. The computer-implemented method of claim 13, wherein the first plurality of pins is disposed on an exterior surface of the connector, and the second plurality of pins is disposed on an interior surface of the port.

19. The computer-implemented method of claim 13, wherein applying a voltage to two or more pins of the second plurality of pins drives a first pin of the first plurality of pins high and a second pin of the first plurality of pins low.

20. The system of claim 1, wherein the optical fiber connector is a first optical fiber connector and the communication cable further comprises a second optical fiber connector disposed at a proximal end of the communication cable, the second optical fiber connector comprising:
a connector body that extends around a proximal end of the optical fiber core, the connector body comprising an exterior surface, and
a second plurality of pins disposed at the exterior surface, the second plurality of pins electrically isolated from the first plurality of pins.

* * * * *